Sept. 8, 1964   A. FRANKEL   3,147,599
STEAM TURBINE POWER PLANTS
Filed July 29, 1963   9 Sheets-Sheet 1
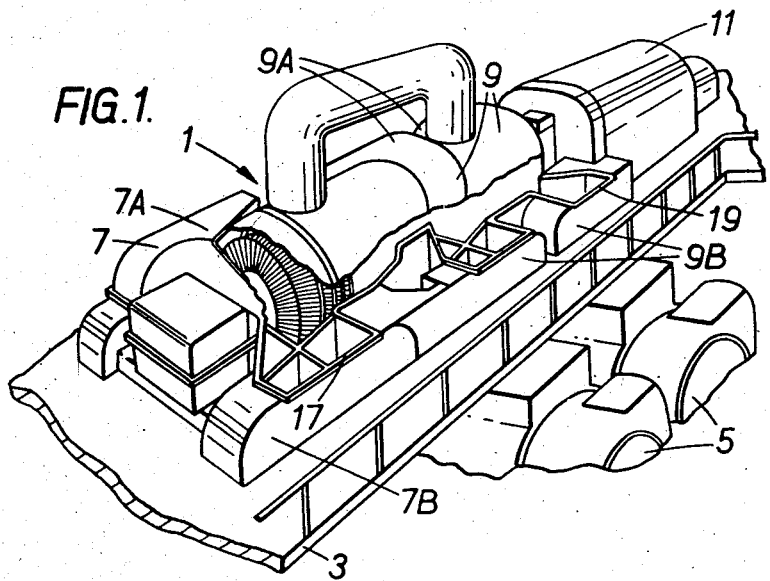
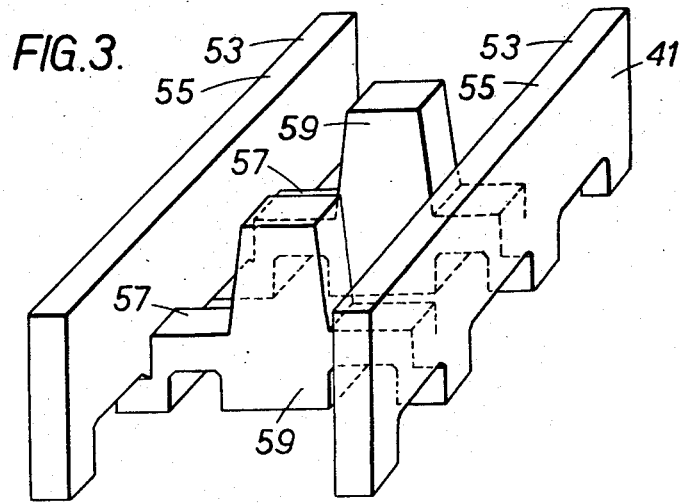

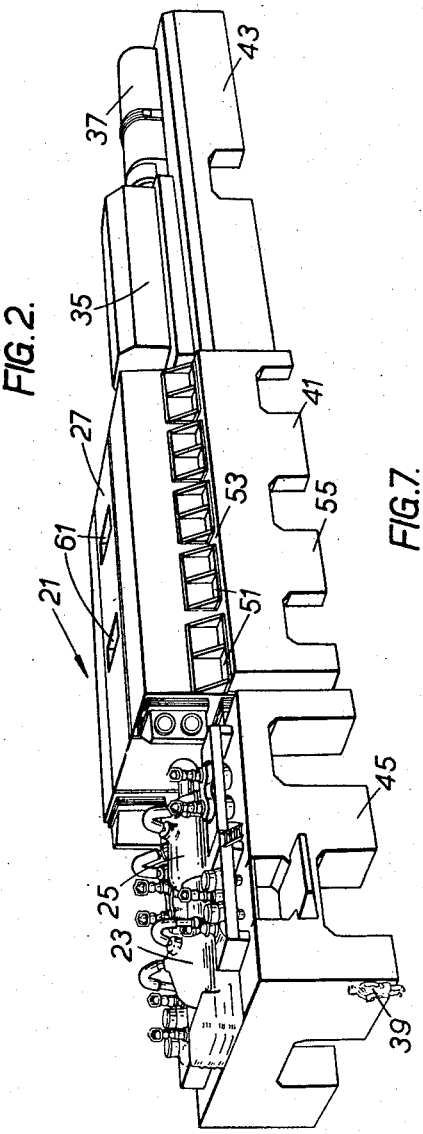
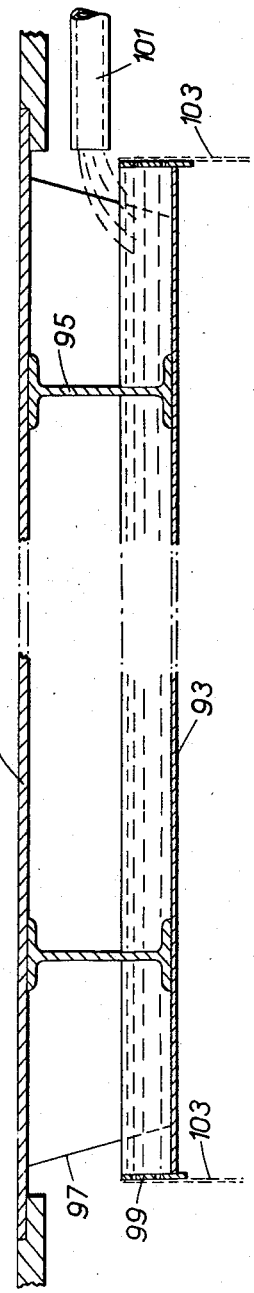

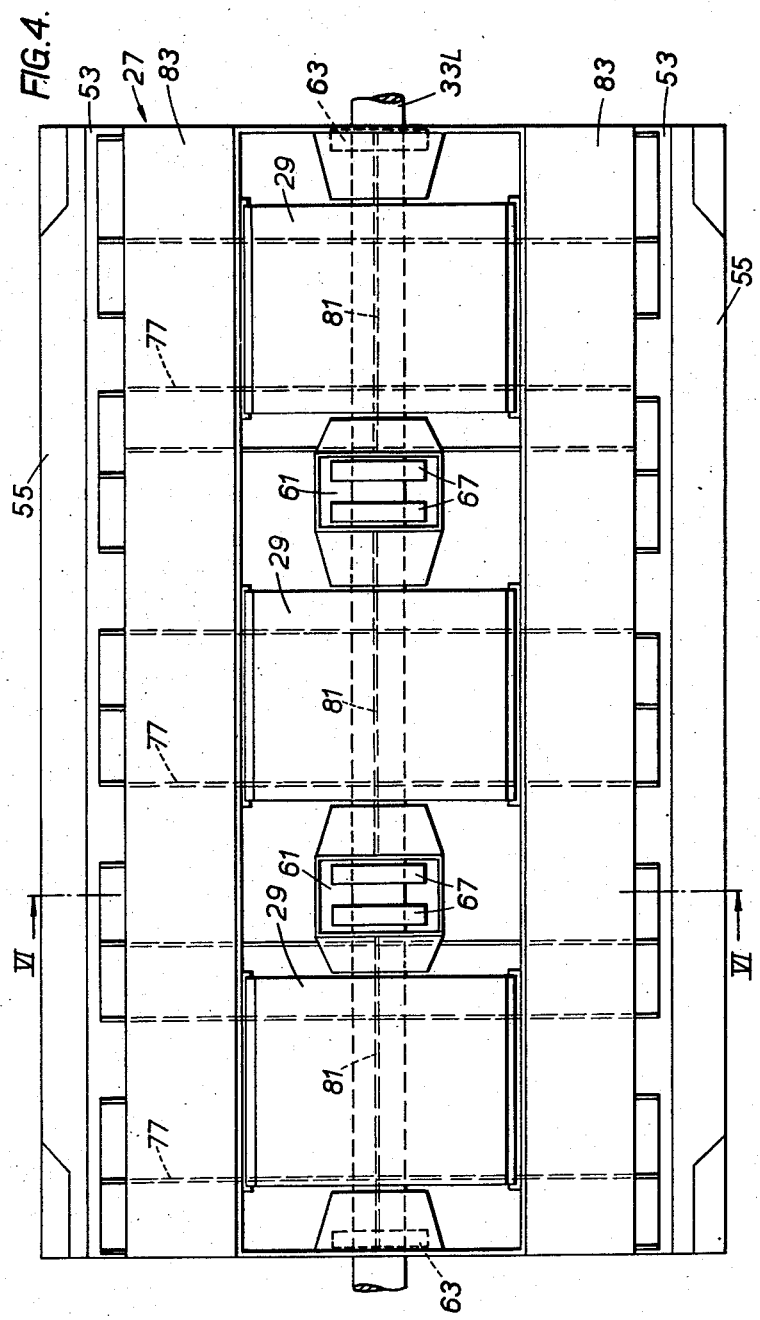

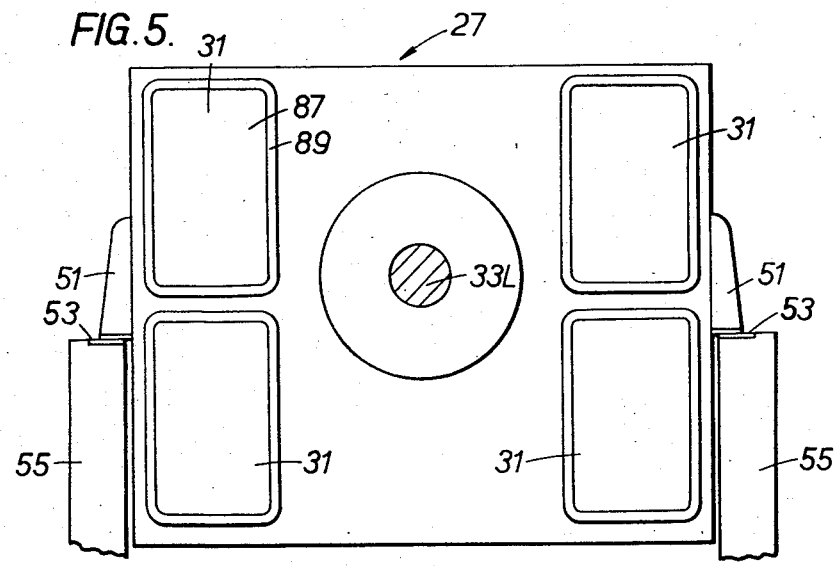
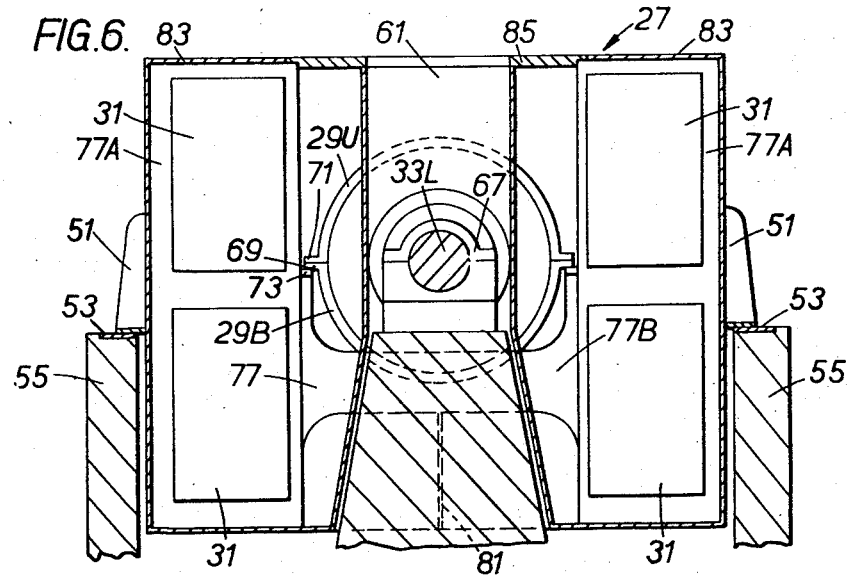

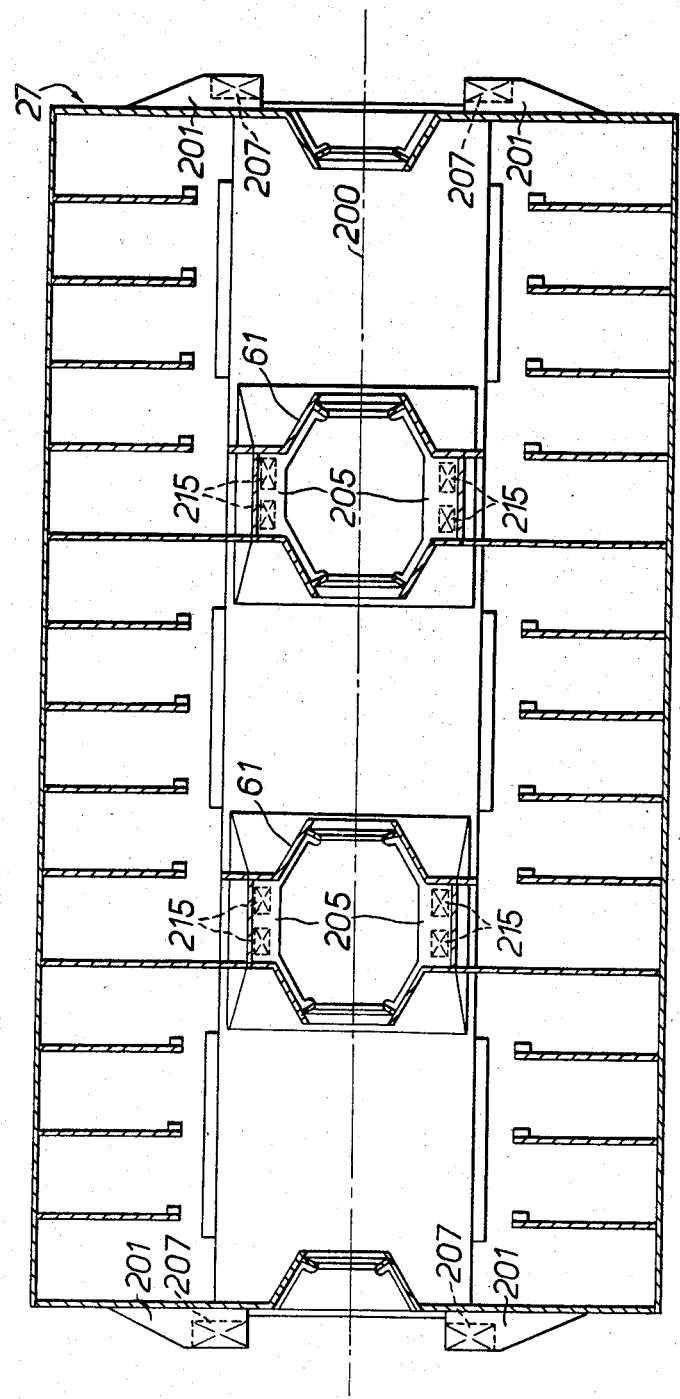

Sept. 8, 1964             A. FRANKEL             3,147,599

STEAM TURBINE POWER PLANTS

Filed July 29, 1963

United States Patent Office 3,147,599
Patented Sept. 8, 1964

3,147,599
STEAM TURBINE POWER PLANTS
Adolf Frankel, Altrincham, England, assignor to Associated Electrical Industries Limited, London, England, a British company
Filed July 29, 1963, Ser. No. 298,262
Claims priority, application Great Britain, Aug. 23, 1962, 32,437/62
25 Claims. (Cl. 60—95)

This invention relates to improvements in steam turbine power plants, and more particularly in steam turbine power plants in which the exhaust steam is passed to condensing plant associated with the turbine.

The low pressure end of a large orthodox steam turbine power plant comprises two or three turbine cylinders disposed on a ground floor of the power house and one or more condensers disposed below the low pressure cylinder or cylinders of the turbine and in a basement of the power house. A single turbine rotor, often divided axially into sections which are bolted together, extends through all the cylinders and is supported on bearings arranged in the open air but carried by the cylinders. Each cylinder includes an internal casing, carrying the fixed guide blades of the turbine, and an outer casing, and both casings are provided with a horizontal joint at the level of the axis of the rotor to facilitate assembly of the turbine.

Since the turbine may weigh hundreds of tons, it must be carried by a very substantial foundation block, and since the condenser is below the turbine, very substantial columns must carry the weight of the turbine down past the condenser to the foundation proper. Further, the horizontal joints in the turbine casings must be machined and erected within very close dimensional tolerances as the alignment of the rotor and the static parts is controlled through them.

An object of the present invention is the provision of an improved steam turbine power plant in which a very large economy in initial cost is achieved by a radial departure from the orthodox construction of turbine power plant.

According to the present invention, a steam turbine installation includes a lower pressure rotor having a horizontal axis and carrying the rotor blades, an inner casing surrounding the rotor and carrying guide blades which in use cooperate with the rotor blades in determining the steam path, condenser means including parts respectively on opposite sides of the rotor and each including steam condensing surfaces disposed at or near the level of the rotor, an outer pressure casing arranged to enclose both the inner casing and the two condenser parts, and bearing means by which the rotor is supported relative to the inner casing and by which the weight of the rotor is transmitted to a foundation without being transferred to the outer casing, wherein the roof of the outer pressure casing is provided with liquid-cooled cooling means arranged and adapted to reduce in use the temperature difference between upper and lower parts of the outer pressure casing.

The invention will now be described, by way of example, with reference to the accompanying diagrammatic drawings, in which:

FIGURE 1 is a perspective drawing of an orthodox steam turbine power plant;

FIGURE 2 is a perspective drawing of a steam turbine power plant according to the present invention;

FIGURE 3 is a perspective drawing of a foundation block shown in FIGURE 2;

FIGURE 4 is a plan view of a low pressure turbine unit shown in FIGURE 2, with a top lid removed;

FIGURE 5 is an end view of the low pressure unit shown in FIGURE 4;

FIGURE 6 is a sectional end view taken on the line VI—VI of FIGURE 4;

FIGURE 7 is a sectional end view of an alternative form for a lid shown in FIGURE 6;

FIGURE 8 is a schematic sectional plan view of an alternative embodiment of the casing only of a low pressure turbine unit;

Figure 9:
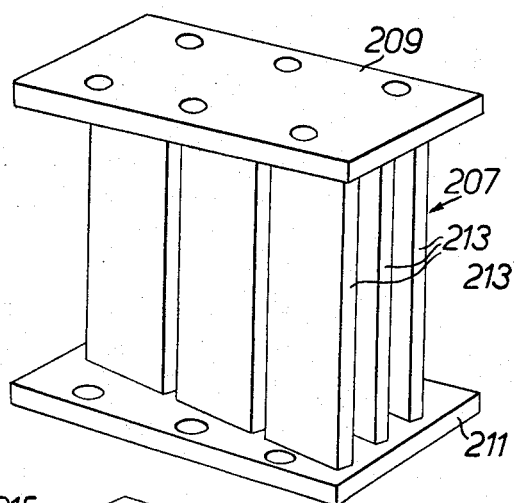
FIGURE 9 is a perspective drawing of a first flexible-blade support shown in FIGURE 8.
Figure 10:
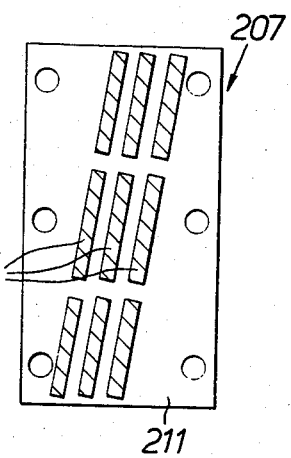
FIGURE 10 is a sectional plan view of the support shown in FIGURE 9.
Figure 11:
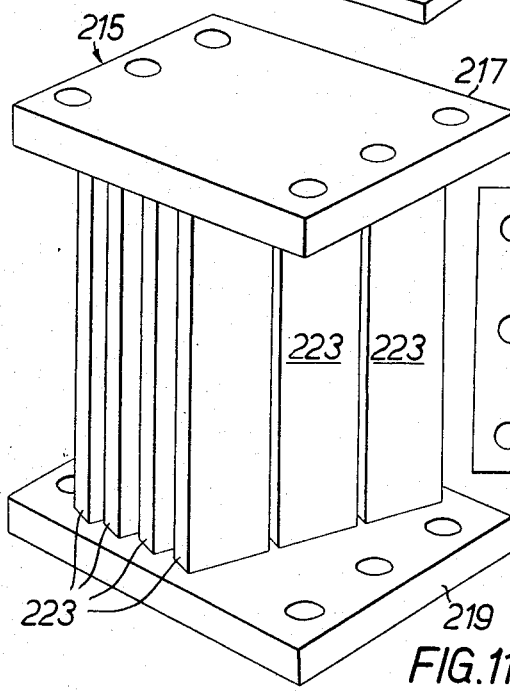
FIGURE 11 is a perspective drawing of a second flexible-blade support shown in FIGURE 8.
Figure 12:
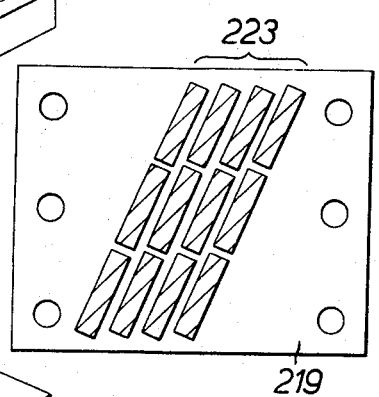
FIGURE 12 is a sectional plan view of the support shown in FIGURE 11.
Figure 13:
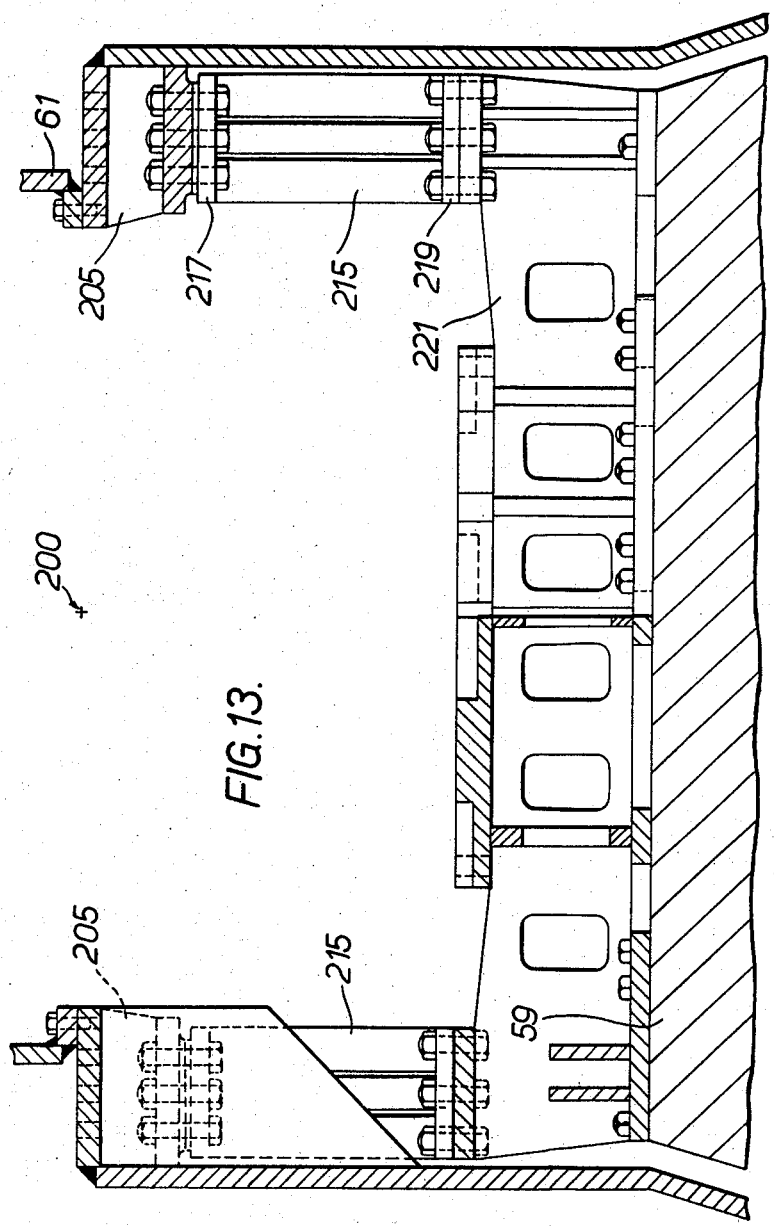
FIGURE 13 is a sectional transverse elevation of an upper end of a pedestal corresponding to one of the pedestals shown in FIGURE 3, and shows the arrangement of the second flexible-blade supports.

Referring first to the orthodox construction of steam turbine power plant shown in FIGURE 1, it will be seen that the steam turbine 1 is mounted on a ground floor 3 while two condensers 5 are mounted below the floor 3 in a basement. The turbine 1 includes a high pressure cylinder 7 and two parallel connected low pressure cylinders 9, each low pressure cylinder exhausting to one of the two condensers. The rotor shaft of the turbine 1 is connected to the rotor shaft of an electrical generator 11, and the turbine rotor shaft is mounted at each end of the high pressure cylinder and at the two outer ends of the adjacent low pressure cylinders on journal bearings which are carried by the cylinders. Each cylinder is prefabricated in two parts, namely an upper part 7A or 9A and a lower part 7B or 9B, and these two parts are coupled by a massive flanged joint 17 or 19.

Referring now to FIGURES 2 to 6, the steam turbine 21 includes a high pressure cylinder 23, an intermediate pressure cylinder 25, and a unit 27 consisting of three parallel-connected low pressure cylinders 29 and four associated condenser banks 31. The rotor shaft 33 of the turbine is in three parts associated respectively with the three sections of the turbine, the parts being connected together by flanged couplings and the part 33L associated with unit 27 being connected to the rotor of an electrical generator 35 provided with an exciter 37. The rated output of generator 35 is 500 megawatts, and the size of the plant can be gauged from the figure of a man shown at 39.

The present invention is directed to the construction of the unit 27, which replaces what would be in an orthodox arrangement three separate double-flow low pressure cylinders and three condensers arranged respectively below the three low pressure cylinders. It will be seen that unit 27 is mounted on a reinforced concrete foundation 41 which is quite separate from reinforced concrete foundations 43 and 45 which carry respectively the generator 35 and the two higher pressure cylinders 23 and 25.

The unit 27 is basically a large rectangular box provided along its longer sides with mounting brackets 51 welded to the box and resting on shoulders 53 formed on the foundation 41, the general shape of which will be clear from FIGURE 3. Two side walls 55 extend parallel to the rotor axis and provide the shoulders 53. Two cross pieces 57 provide respectively two massive pedestals 59 which serve to support the part 33L of the rotor of the turbine, in a manner described more fully below. The upper end of each pedestal extends into an upright trunking 61 which extends upwardly through the box-like unit and is open at the top. The part of each trunking 61 above the rotor is removable upwardly to permit removal of the rotor. The various apertures in the foundations 41 are provided for the passage of sundry pipes and cables which will not be described in detail.

The weight of the rotor part 33L is carried at one end by a bearing 63 mounted on a bracket carried by the foundation 43, at the other end by a bearing 65 mounted on a bracket carried by the foundation 45, and at two intermediate zones, each between a pair of the low pressure cylinders 29, on bearings 67 mounted on the pedestals 59. Where the rotor shaft passes through various walls of the unit 27, suitable labyrinth seals are provided.

Each of the low pressure cylinders 29 consists of a lower inner casing 29B (see FIGURE 6) provided with horizontal flanges 69 at the level of the axis of the rotor part 33L, and an upper inner casing 29U also provided with flanges 71 which are suitably bolted to the flanges 69. These casings are provided in orthodox manner with diaphragms carrying the fixed guide blades. The lower surfaces of the flanges 69 rest on horizontal supports 73 carried by upright channel members secured to the edges of sagging plates referred to below.

The box like unit 27 is provided with cross plates 77 each of which is generally U-shaped, the upright legs 77A being formed with a multiplicity of holes to accommodate condenser tubes indicated generally at 79 and acting as sagging plates, and the cross part 77B extending across the unit below the turbine shaft. These plates, together with upright longitudinally extending plates 81 which are disposed under the turbine shaft, are welded to one another and to the outside walls of the unit and to the walls of the trunking 61 to form a very rigid structure. It will be seen that the condenser tubes 79 are arranged in four banks 31, two banks adjacent each foundation walls 55, and two of the banks being above the rotor axis and two of the banks being below the rotor axis. The roof of the unit 27 includes two fixed parts 83 respectively above the two upper condenser tube banks, and a removable lid 85 which closes the space between the parts 83 with the exception of the upper ends of the two trunking 61.

The two end walls of the unit 27 are provided with tube plates at 87 (see FIGURE 5) to accommodate the ends of the condenser tubes in orthodox manner, and these tube plates are surrounded by bearing flanges 89 to which are bolted suitable water inlet chambers (at one end of the unit) or water outlet chambers (at the other end of the unit) to which are coupled the inlet pipes and the outlet pipes for the cooling water which is to flow through the condenser tubes. Suitable stay bolts (not shown) extend between each pair of opposite tube plates, in conventional manner.

FIGURE 7 illustrates a preferred form for the removable lid 85. The lid comprises an upper plate 91 and a lower plate 93 joined by spacing members 95 and 97. The lower plate 93 is encircled by an upright rim 99 to form a tray. The rim is formed with water discharging holes, and a water pipe 101 is arranged to discharge condensate into the tray. The number and size of the holes in the rim 101 are so chosen that the tray is filled with water and continually spills over its edge water which falls as a curtain 103.

In use of the steam turbine power plant, steam at high temperature and pressure is fed to the high pressure cylinder 23, in which it expands and exerts a torque on this part of the turbine rotor. This steam is then returned to a steam reheater of the associated steam generating unit, and from thence flows to the intermediate pressure cylinder 25. Steam exhausted from the cylinder 25 passes through steam mains positioned in the foundation 41 below the unit 27 and enters upwardly a central steam chest in each of the inner casings of the low pressure cylinders 29. In each cylinder 29 the steam divides and flows axially in both directions between the rotor blades and between the rotor blades and between the fixed guide blades to exert a torque on the rotor. Exhausted steam flows from the axial ends of the cylinders 29 and then flows sidewardly towards the condenser tubes 79, to give up its latent heat and condense. Suitable air ejectors and water pumps remove the residual gases and the condensate.

The weight of the rotor part 33L is supported quite independently of the box-like unit 27. The box-like unit 27 is so rigid between the two walls 55 that no appreciable sagging of it takes place, and what sagging does take place is easily accommodated by the radial clearances between the rotor and the surrounding seals and guide blades. The rotor is located axially by a thrust bearing adjacent the high pressure cylinder 23.

It will be appreciated that one possible cause of distortion of the unit 27 would be the differential heating of the upper and lower halves of the unit. Although whenever the steam leaving the low pressure cylinders 29 is wet the whole inside of the walls of the unit 27 will also be wet and therefore at a substantially uniform temperature, under other loads the steam may be dry or even superheated at the low pressure prevailing. By the use of the construction shown in FIGURE 7, and the continual discharge into the tray of condensate amounting to say 3% of the condensate obtained at full load on the unit, firstly the lid 85 is always maintained at about the condensate temperature and secondly steam leaving each low pressure cylinder inner casing 29 has to penetrate a curtain 103 of falling condensate before it can impinge on any of the external walls of the structure. In this manner the possibility of serious differences in temperature between the upper and lower parts of the unit 27 can be avoided. The arrangement of the condensate supply pipe 1 is such (see FIGURE 7) that there is no need to break any joint in the pipe when the lid 85 is being removed.

The arrangement of power plant described above eliminates the need for separate pressure vessels for the low pressure cylinder outer casing and the condenser tubes, and this can, in an installation similar to that described, reduce the weight of the fabricated steel structure by as much as 400 tons. Since the rotor is supported independently of the low pressure cylinder, the difficult design problem of allowing for elastic flexibility of the low pressure cylinder when considering the dynamics of the large and heavy rotor is avoided. The height of the foundation block of the unit 27 is some 20 feet less than would be the case in a conventional arrangement. As an immediate result, the size of the building for housing the plant can be considerably reduced. The effective flow area for exhaust steam flowing from the low pressure cylinders to the condenser tubes is practically doubled, and this reduces the pressure drop between the last stage of the turbine and the condenser. The two shafts 61 serve to support the lid 85 against the force due to atmospheric pressure acting upon its upper surface. When the lid is bolted into place, it further stiffens the unit 27, although the cross ribs described above ensure that the unit is sufficiently rigid even when the lid is removed for maintenance of the turbine rotor. The expense of condenser supporting springs, which are necessary in an orthodox installation such as that shown in FIGURE 1, when the condenser is rigidly bolted to the bottom of the low pressure cylinders, is avoided.

In the power plant described above, the rotor is supported independently of the said inner and outer casings, and it is practicable to make the outer casing so stiff that little sagging occurs between the side regions where it is supported by the brackets 51 on the walls 53.

FIGURES 8 to 17 show an alternative embodiment of the invention, in which the effect of sagging of the outer pressure casing of unit 27 on the running clearances in the turbine is greatly reduced. It will be appreciated that the most important result of sagging is to change the clearance between rotor part 33L and the surrounding guide blades and seals. Further, differential shrinking of the concrete is also liable to effect running clearances. In the arrangement shown in FIGURE 8, the outer casing is no longer supported along its outer two edges, but is supported adjacent the vertical plane through the rotor axis 200, so that the length of the "beam" between supports on opposite sides of the rotor axis is much reduced. Since the deflection of a centrally loaded beam varies as the cube of its length, a reduction of the effective length of the beam greatly reduces its deflection, while in the present case, since much of the weight is near the sides of the turbine unit, over the part of the beam between the supports the beam is oppositely loaded by the weight of the centre part of the unit and by the weights of the two side parts of the unit, producing only a very small resultant deflection.

At each end the unit 27 is provided with two brackets 201 respectively on opposite sides of the centre line 200 of the rotor part 33L and in each of the two trunking 61 (see FIGURE 13) two brackets 205 are provided on each side of the centre line 200. Each of the brackets 201 and 205 rest on a flexible-plate support mounted on the foundation 41. Each bracket 201 is thus mounted on a support 207 (see FIGURES 9 and 10) which consists of an upper plate 209 bolted to the bracket and a lower plate 211 bolted to a suitable sole plate mounted on the foundation, and three upright metal plates 213 each welded at its upper and lower edges to the plates 209 and 211 respectively. Each bracket 205 is mounted on a support 215 (see FIGURES 11 and 12) which consists of an upper plate 217 bolted to the bracket and a lower plate 219 bolted to a soleplate 221 which also serves as a soleplate for the bearing 57 and is mounted on one of the pedestals 59. The support 215 includes twelve metal plates 223 extending between and welded at their ends to the upper plate 217 and the lower plate 219. The outer casing of unit 27 is positively located at an anchor point which is at the mid-width and mid-length of the units and is at the bottom of the casing. The longer transverse dimension of each of the plates 223 is normal to the vertical plate through the anchor point. With such an arrangement of the plates 223, they accommodate thermal elongation of the unit 27 away from the anchor point. The plates 223 in the supports 215 on the opposite side of the rotor axis are similarly arranged, as are the plates 213 of support 207. In the embodiment of the invention shown in FIGURES 1 to 6, reference is made to a lid 85, and FIGURE 7 shows a construction of lid which is continuously water cooled, and discharges a cooling curtain of water, to ensure that superheated steam does not impinge upon the roof and upper parts of the walls of the box-like unit 27. This concept of water cooling can advantageously be extended to include the whole of the roof of the unit 27, and FIGURE 14 illustrates an arrangement in which such cooling is effected.

Figure 14:
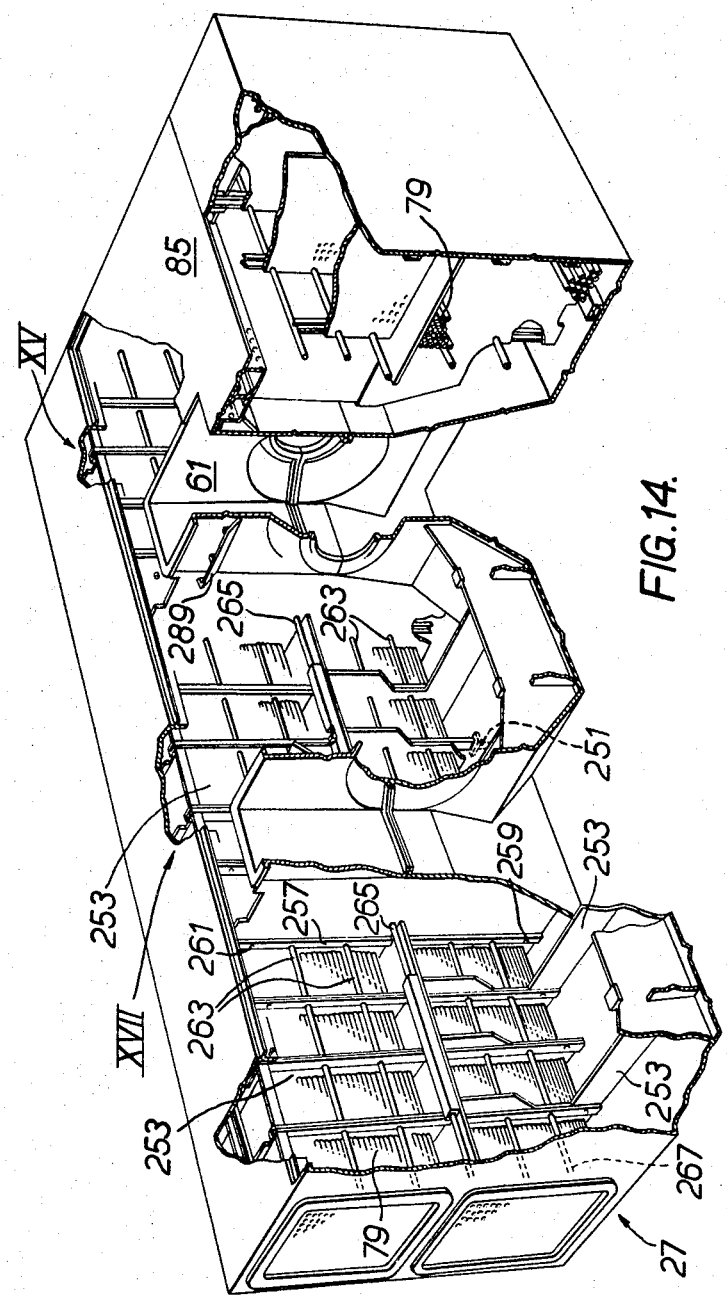
FIGURE 14 is a perspective broken-away drawing of the casing only of the low pressure turbine unit shown in FIGURES 8 to 12.

The unit 27 shown in FIGURE 14 is arranged for support in the manner described with reference to FIGURES 8 to 13. It is supplied with condensate for cooling purposes through a supply pipe 251 disposed at one side of the turbine rotor and at about the mid-length of the unit 27, and by a symmetrically arranged second supply pipe (not shown) disposed on the nearer side of the turbine rotor. The box-like unit 27 is provided with plates 253 which include upright legs formed with a multiplicity of holes to accommodate the condenser tubes, and acting as sagging plates. The vertical inner edge of each of these legs is stiffened by channel members which, with a leg forms a duct 257 which serves as a pipe for the conveyance of cooling water supplied by pipe 251, so that these vertical inner edges are maintained relatively cool. Each duct 257 has a water discharge nozzle 259 near its lower end and a water discharge nozzle 261 near its upper end, these being arranged to discharge water in the direction of the length of the rotor. Four horizontal tubular struts 263 extend along each side of the turbine rotor to brace the plates 253, and these pass through and connect together, for the flow of condensate, the ducts 257. A fifth horizontal tubular strut 265 is in three sections, each serving one of the low pressure parts of the turbine, and each including a central part of square section which acts as a mounting for the upper and lower parts of the inner casing of that turbine part. Each section of strut 265 is joined by a short tube to one of the ducts 257, by which it is supplied with water. At each end of the unit 27, each tubular strut 263 and 265 is provided with a water discharging orifice 267 arranged to direct water across the adjacent end wall of the unit 27 inwardly towards the rotor. In this manner a flow of water through each tubular strut is ensured.

Figure 15:
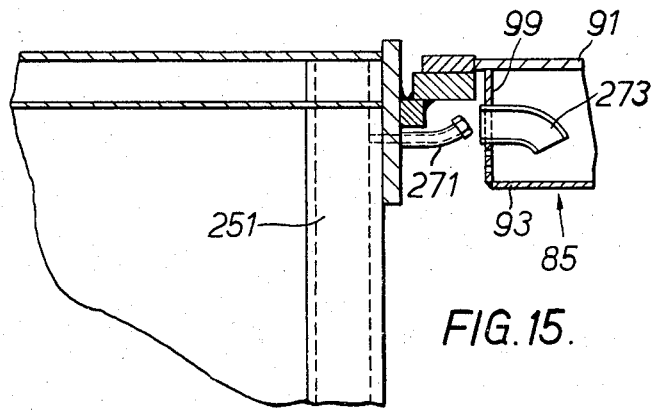
FIGURE 15 is a sectional end elevation of mechanical detail at the location indicated by arrow XV in FIGURE 14.
Figure 17:
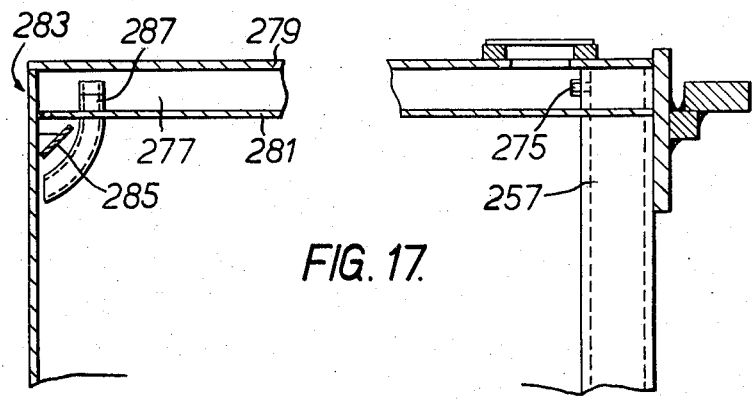
FIGURE 17 is a sectional end elevation of mechanical detail at the location indicated by arrow XVII in FIGURE 14.
Figure 16:
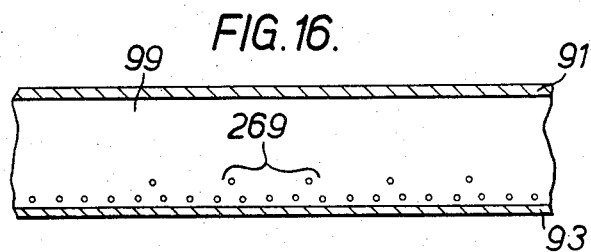
FIGURE 16 is a sectional side elevation showing the arrangement of water discharging holes in a lid shown in FIGURE 14.

The unit 27 has a lid 85 which is water cooled, while the parts of the roof above the condenser tubes 79 are also water cooled. As shown in FIGURE 15, the lid 85 comprises an upper plate 91 and a lower plate 93 joined by suitable spacing members similar to members 95 and 97 in FIGURE 7. The lower plate is encircled by an upright rim 99 to form a tray, and this rim is formed around its lower edge with water discharging holes 269 as indicated in FIGURE 16. Condensate is supplied to this tray from each of three of the ducts 257 (see FIGURE 15) through a nozzle 271 arranged opposite a downwardly curved tube 273 carried by the rim of the lid 85. At three locations, as shown in FIGURE 17 water is supplied from one of the ducts 257 through a nozzle 275 into a horizontally extending chamber 277 between the upper boundary 279 of the unit 27 and a parallel plate 281. Along its outer edges the plate 281 is formed with a multiplicity of holes 283 of ⅛ inch diameter set at a pitch of 2½ inches, arranged to discharge water downwardly near the vertical outer wall of the unit 27. A deflector plate 285 disposed immediately below the holes 283 is arranged to deflect water discharged from these holes so that it falls as a film over the inside of the outer wall of the unit 27. An overflow pipe 287 enables a more rapid discharge of water from the chamber 277 should the inflow exceed the normal outflow. Similar deflector plates 289 are mounted on the sides of the trunkings 61 below the regions where facing parts of the rim of the lid 85 discharge jets of cooling water.

In operation of the unit 27 shown in FIGURE 14, condensate collects in the lower part of the unit and so maintains the temperature of the lower part at a desired level. A constant supply of condensate through supply pipe 251 and its twin ensures that the parts of the roof of the unit above the condenser banks and the lid 85 are kept at a relatively low temperature by the water trapped in the subjacent trays. The holes 269 in the tray of the lid 85 ensure that a curtain of falling water lies in the path of steam flowing from the turbine exhausts towards the condenser banks. The discharge of water from the chambers 277 over the vertical side walls of the unit 27 ensures that these are also kept relatively cool, while the discharge of water from the orifices 267 on the tubular struts 263 and 265 ensures that the end walls of the unit 27 are also kept relatively cool.

In the arrangement of FIGURES 1 to 7, it is important that the unit 27 shall be sufficiently rigid laterally to ensure that the inner casing shall be properly spaced relative to the rotor. However, in the arrangement of FIGURES 8 to 17, this problem is much reduced in severity, since the axial lines of support of the inner casings on the outer casings are substantially in the same vertical plane as the axial lines of support of the outer casing. Although the arrangement of FIGURE 8 enables the side walls of the foundation block to be eliminated, in practice it may prove advantageous in some cases to provide some support to the unit 27 along its side edges. Such support could be in the form of springs, and would be relatively simple to arrange since the exact vertical positioning of these edges of the unit 27 would no longer be critical.

Further, the massive U-shaped support plates used in the construction of FIGURES 1 to 7 can be replaced with a much lighter structure, and in some cases it may prove advantageous to support the side parts of the unit 27 from above by a cantilever arrangement stemming from the supported central axially-extending region of the unit.

The condensate extraction pump of the unit 27 normally supplied the cooling condensate which is supplied to the trays and passages by which the various parts of the unit are cooled. In operation of the electrical generator associated with the turbine, it may be necessary to shed the electrical load suddenly, which will lead to a sudden reduction in the flow of steam into the unit 27, or even to trip the turbine, in which case the flow of steam stops quite rapidly. To meet such emergencies, particularly that of tripping of the turbine, preferably means are provided for the supply of cooling condensate in an emergency. These means can comprise a direct current driven pump arranged in an emergency to supply condensate, or a gravity tank similarly arranged to supply condensate, or a connection from the surge tank. If the arrangement consists of a gravity tank continuously replenished by the condensate supply, then the temperature of the cooling water will automatically be correct and correspond to the saturation temperature of the steam inside the low pressure casing. If, however, the emergency supply is from the surge tank, the temperature of the water from that source is liable to be much higher than desirable for cooling the casing, and desirably means would be provided for tempering this water. Thus flashing-off of the condensate supply in an intermediate overhead tank which is connected direct to the condenser can be effected.

What I claim is:

1. A steam turbine installation including:
   (a) a low pressure rotor having a horizontal axis and carrying rotor blades;
   (b) an inner casing surrounding the rotor and carrying guide blades which in use cooperate with the rotor blades in determining the steam path;
   (c) condenser means including parts respectively on opposite sides of the rotor and each including steam condensing surfaces disposed at or near the level of the rotor;
   (d) an outer pressure casing arranged to enclose both the inner casing and the two condenser parts;
   (e) bearing means by which the rotor is supported relative to the inner casing and by which the weight of the rotor is transmitted to a foundation other than through the outer casing; and
   (f) liquid-cooled cooling means arranged and adapted to cool the roof of the outer pressure casing and adapted to reduce in use the temperature difference between upper and lower parts of the outer pressure casing.

2. A steam turbine installation according to claim 1, in which the cooling liquid is condensate produced in the condensing means and still substantially at the temperatue of condensate collecting in the lower parts of the outer pressure casing.

3. A steam turbine installation according to claim 1, in which the cooling means including passages arranged for the flow of the cooling liquid and disposed on the inner side of the outer pressure casing.

4. A steam turbine installation according to claim 3, in which tray means are provided on the underside of part of the roof of the outer pressure casing and water supply means are arranged in use to maintain the tray means flooded with water.

5. A steam turbine installation according to claim 4, in which the said part of the roof is or includes a central part of the roof overlying the rotor, and the tray means associated with this central part are provided with water discharging openings so arranged that in use they provide curtains of falling water through which exhaust steam from the inner casing must pass in flowing to the condensers.

6. A steam turbine installation according to claim 5, in which the said part of the roof is in the form of a removable lid.

7. A steam turbine installation according to claim 4, in which the said part of the roof is or includes two side parts of the roof overlying respectively the two parts of the condenser means, and the tray means associated with these side parts are provided along the sides of the outer pressure vessel with water discharging openings arranged in use to provide a film of falling water on the inner surfaces of the side walls of the outer pressure vessel.

8. A steam turbine installation according to claim 4, in which water discharging means are arranged to discharge water onto the inner surface of the parts of the end walls of the outer pressure casing which lie between the two parts of the condenser means.

9. A steam turbine installation according to claim 1, in which each condenser part consists of tubes which extend parallel to the axis of the turbine rotor and are arranged to convey a cooling fluid.

10. A steam turbine installation according to claim 1, in which the outer casing is in the form of a rectangular box.

11. A steam turbine installation according to claim 1, in which the outer pressure casing includes stiffening cross members, the stiffening cross members are in the form of metal sheets and upright inner edges of these sheets, disposed between the parts of the condenser means, are provided with liquid-cooled stiffening members which extend along the said edges.

12. A steam turbine installation according to claim 11, in which horizontal members join the stiffening members of neighboring sheets and serve as further stiffening members.

13. A steam turbine installation according to claim 12, in which the horizontal members are liquid-cooled tubes arranged for the continuous throughflow of cooling liquid.

14. A steam turbine installation according to claim 13, in which the horizontal members are arranged to discharge cooling liquid into the interior of the outer pressure casing.

15. A steam turbine installation according to claim 1, in which the weight of the rotor is transmitted to the foundation independently of the weight of the inner and outer casings.

16. A steam turbine installation according to claim 1, in which the outer pressure casing is supported along its sides remote from the rotor axis.

17. A steam turbine installation according to claim 1, in which the outer pressure casing is supported at several points spaced along the length of the rotor and located inboard of the parts of the condenser means.

18. A steam turbine installation according to claim 1, in which the low presure rotor includes a plurality of bladed sections each surrounded by such an inner casing, and the outer casing is formed with an upright trunking through which the rotor extends and in which is provided an intermediate bearing for the rotor.

19. A steam turbine installation according to claim 18, in which part of the weight of the outer pressure vessel is supported by supporting means extending upwardly in the trunking.

20. A steam turbine installation according to claim 18, in which means are provided by which in use the walls of the trunking can be liquid cooled.

21. A steam turbine installation according to claim 1, in which the outer pressure casing is supported on a foundation by supporting means providing positive location in the vertical direction and permitting thermal expansion of the casing.

22. A steam turbine installation according to claim 21, in which the supporting means consist of metal plates or strips arranged to extend substantially vertically between a member attached to the pressure casing and a member attached to the foundation.

23. A steam turbine installation according to claim 22, in which the outer pressure casing is located against axial movement at a point intermediate its ends, and the metal plates or strips are arranged with their length and width dimensions extending substantially normally to a vertical plane through that point of location and with their thickness dimension substantially parallel to that plane.

24. A steam turbine installation according to claim 1, in which the liquid cooling means are arranged to receive condensate from a condensate extraction pump associated with the outer pressure casing, and alternative condensate supply means are arranged to supply condensate to the cooling means should the condensate extraction pump become ineffective upon a sudden reduction in the load on the turbine installation.

25. A steam turbine installation according to claim 24, in which the alternative condensate supply means comprise a gravity tank normally continuously replenished by the condensate supply to the liquid cooling means.

No references cited.